March 11, 1924.

C. G. CATHER

COMBINATION SANITARY DISPLAY AND STORAGE TRAY

Filed Sept. 12, 1921

1,486,416

Inventor
Clarence G. Cather.
By Frank S. Appleman,
Attorney

Patented Mar. 11, 1924.

1,486,416

UNITED STATES PATENT OFFICE.

CLARENCE G. CATHER, OF SELMA, CALIFORNIA.

COMBINATION SANITARY DISPLAY AND STORAGE TRAY.

Application filed September 12, 1921. Serial No. 500,036.

*To all whom it may concern:*

Be it known that I, CLARENCE G. CATHER, a citizen of the United States of America, residing at Selma, in the county of Fresno and State of California, have invented certain new and useful Improvements in Combination Sanitary Display and Storage Trays, of which the following is a specification.

This invention relates to meat racks, and particularly to combined sanitary display and storage trays or pans for butchers' use, the said invention having for its object the provision of novel means whereby meat may be supported on an inclined platform or holder in order that it may be displayed; the said device also including novel means for causing the moisture, such as water or blood, which may gravitate from the meat, to collect and be held under the support in order that the platform or meat support proper may be kept in a sanitary state and the contents of the pan may be shielded from observation by the customers.

A further object of this invention is to provide a sanitary support and tray of the character indicated wherein the meat supporting elements may be removably applied to the tray for the purpose of gaining access to the interior of the tray for draining the same and cleaning it, the said support having drain openings at its edge or edges to facilitate the escape of the moisture from the upper surface of the support; the said support constituting with the flange of the tray, a gutter-like confining structure which will prevent the moisture from escaping over the top of the flange of the tray.

A still further object of this invention is to produce a tray and support of the character indicated which will prove comparatively inexpensive, since it can be constructed of metal by stamping processes so that the support can be finished practically at one operation.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

In these drawings 5 denotes the tray or receptacle having its sides shaped to form a horizontal shoulder 6 and a vertical flange 7 extending upwardly therefrom, the flange being offset outwardly with relation to the lower portion of the side of the tray. The tray is constructed preferably of metal such as will not corrode, and it may be manufactured in the form of enamelware, although that is a feature which really does not enter into the invention and has to do with its production.

Figure 1:
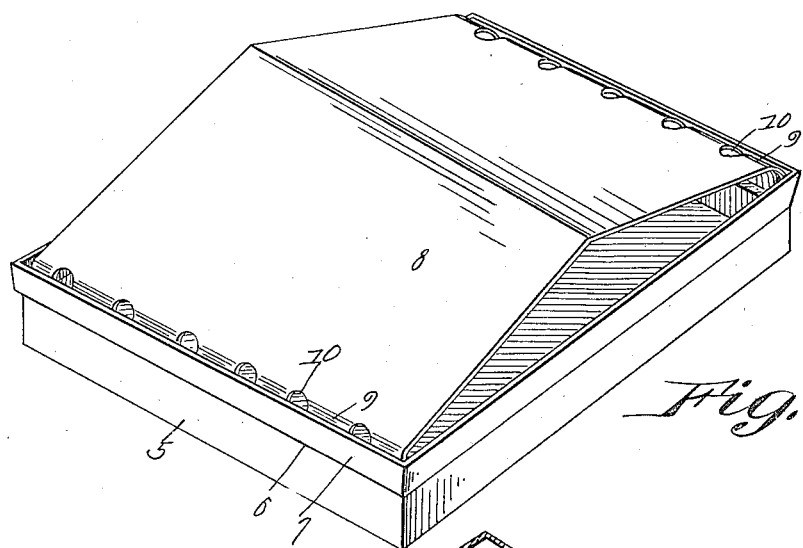
Figure 1 illustrates a view in perspective of a combined tray and support, showing one embodiment of the invention.
Figure 2:
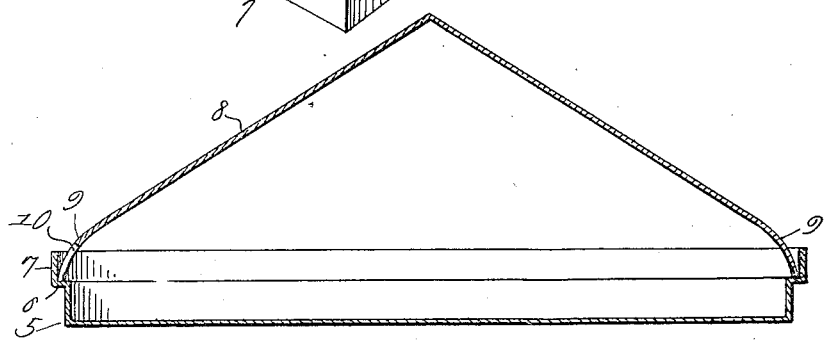
Figure 2 illustrates a transverse sectional view thereof.

The platform or meat supporting element in the form shown in Figs. 1 and 2 comprises a plate 8 considerably higher in the center than at the edges, the said edges being flanged or downwardly curved, as shown at 9, and the said platform is of a dimension which will permit the edges of the support to rest on the flanges of the tray. The plate has recesses or apertures 10 formed in its edges which constitute the drain openings to permit the moisture, such as water or blood, from the meat to escape to the interior of the tray, and preferably, the edges of the support retain the said support in such relation to the flange 7 to form a gutter-like space which will guard against the escape of the moisture over the top of the flange.

Figure 3:
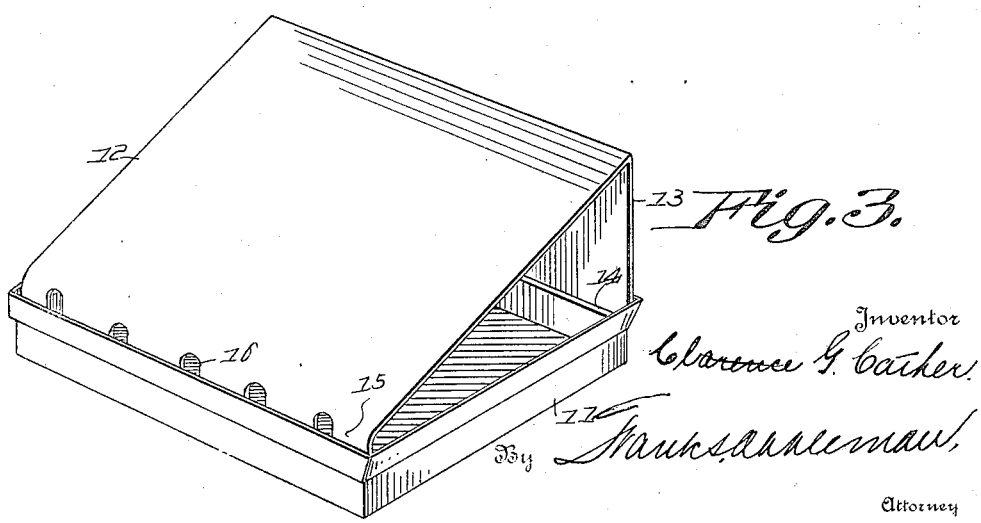
Figure 3 illustrates a perspective view of a combined tray and support embodying a slight modification.

In that form of the invention shown in Fig. 3, the tray 11 is similar in construction to the tray 5, although it may be smaller. Of course the proportions of the device do not enter into the invention and they may be modified to suit particular requirements. In the form shown in Fig. 3, however, the support 12 has a single inclined surface which is intended to display the meat, the said support having a downwardly extending flange 13 at its rear end which rests on a shoulder 14 of the tray 11, whereas the front of the support has a downwardly extending edge 15 which rests on the opposite flange of the tray. As in the construction shown in Figs. 1 and 2, the support has recesses or apertures 16 which form drain openings for the escape of the moisture, and in all respects, the form shown in Fig. 3 will operate as disclosed in Figs. 1 and 2, except that the support and display surface is single.

I claim:

In a meat display rack and drain, a tray having sides provided with shoulders terminating in upwardly extending flanges, a meat supporting plate having angularly disposed portions, the end edges of the said angularly disposed portions resting on the said shoulders and at least one of said angularly disposed portions being inclined and terminating in a downwardly curved edge provided with apertures, the said edge of the plate having its curved portion free of the side of the tray above the shoulder on which it is supported.

CLARENCE G. CATHER.